United States Patent
Squires (10) Patent No.: US 7,963,033 B2
(45) Date of Patent: *Jun. 21, 2011

(54) REMOTELY MOUNTABLE TURBO SYSTEM AND METHOD OF INSTALLING

(75) Inventor: Richard K. Squires, Lindon, UT (US)

(73) Assignee: Squires Turbo Systems, Inc., Orem, UT (US)

( * ) Notice: Subject to any disclaimer, the term of this patent is extended or adjusted under 35 U.S.C. 154(b) by 62 days.

This patent is subject to a terminal disclaimer.

(21) Appl. No.: 12/145,401

(22) Filed: Jun. 24, 2008

(65) Prior Publication Data

US 2009/0000118 A1  Jan. 1, 2009

Related U.S. Application Data (63) Continuation of application No. 11/590,647, filed on Oct. 30, 2006, now Pat. No. 7,469,539, which is a continuation of application No. 10/795,805, filed on Mar. 8, 2004, now Pat. No. 7,134,282, which is a continuation of application No. 10/400,828, filed on Mar. 27, 2003, now Pat. No. 6,745,568.

(51) Int. Cl.
- *B21D 39/00* (2006.01)
- *B21K 21/16* (2006.01)
- *B23P 6/00* (2006.01)
- *F02B 43/00* (2006.01)
- *F02B 33/44* (2006.01)

(52) U.S. Cl. ............... 29/888.011; 29/401.1; 29/428; 60/605.1; 123/528

(58) Field of Classification Search .......... 29/428, 29/888.01, 888.02, 888.021, 888.025, 889.2, 29/890.08, 890.148; 60/597, 605.1, 605.3, 60/626; 184/6.11, 6.16; 123/528; 417/407
See application file for complete search history.

(56) References Cited

U.S. PATENT DOCUMENTS

| | | | |
|---|---|---|---|
| 2,774,342 A | 12/1956 | Schilling | 123/561 |
| 3,935,848 A | 2/1976 | Gamell | 123/565 |
| 4,142,608 A | 3/1979 | Sarle | |
| 4,203,296 A | 5/1980 | Tanaka et al. | 60/602 |
| 4,364,717 A | 12/1982 | Schippers et al. | |
| 4,422,295 A | 12/1983 | Minami et al. | 60/605.3 |

(Continued)

FOREIGN PATENT DOCUMENTS

DE  3644356 A1  7/1988

(Continued)

OTHER PUBLICATIONS

Burien Toyota, Burien Toyota 5S-FE Turbocharger, May 9, 2002, pp. 1-14, http://meisners.net/camry/5sfeTurbo.pdf.*

(Continued)

*Primary Examiner* — David P Bryant
*Assistant Examiner* — Alexander P Taousakis
(74) *Attorney, Agent, or Firm* — Morris O'Bryant Compagni, P.C.

(57) ABSTRACT

A turbocharger system for a combustion engine and method of installing a turbocharger system includes a turbocharger having an oil inlet and an oil outlet configured for being coupled to an oiling system. An oil pump is connected to the oil outlet of the turbocharger and is further connected to the oiling system. The turbocharger system also includes mounting hardware for mounting the turbocharger to an exhaust pipe away from the engine at or below the oil level of the oiling system. In one embodiment, the method of installing the turbocharger system includes removing an existing muffler from the vehicle and mounting the turbocharger at or near the location of the existing muffler.

28 Claims, 6 Drawing Sheets

U.S. PATENT DOCUMENTS

| | | | |
|---|---|---|---|
| 4,520,773 A | 6/1985 | Koslow | 123/198 A |
| 4,553,387 A | 11/1985 | Mayer | 60/280 |
| 4,628,877 A | 12/1986 | Sundles et al. | 123/196 S |
| 4,709,548 A | 12/1987 | Conrad et al. | 60/280 |
| 4,716,735 A | 1/1988 | Ruf et al. | 60/605.3 |
| 4,752,193 A | 6/1988 | Horler | 417/407 |
| 4,926,641 A | 5/1990 | Keller | 60/605.3 |
| 4,928,637 A | 5/1990 | Naitoh et al. | 60/605.3 |
| 4,953,515 A | 9/1990 | Fehr et al. | 123/526 |
| 4,958,600 A | 9/1990 | Janthur | 60/605.3 |
| 5,014,820 A * | 5/1991 | Evans | 184/6.3 |
| 5,078,963 A | 1/1992 | Mallen | 420/443 |
| 5,323,612 A | 6/1994 | Werner | 60/605.1 |
| 5,390,651 A * | 2/1995 | Nussbaum et al. | 123/694 |
| 5,499,693 A | 3/1996 | Widenhorn | 184/6.24 |
| 5,566,548 A | 10/1996 | Khurana | 60/322 |
| 5,709,081 A | 1/1998 | Bruestle | 60/280 |
| 5,934,070 A | 8/1999 | Lagelstorfer | 60/280 |
| 6,089,211 A | 7/2000 | Wenger | 60/280 |
| 6,289,853 B1 | 9/2001 | Walczak et al. | 123/25 R |
| 6,371,092 B1 | 4/2002 | Guglielmo et al. | 123/527 |
| 6,439,836 B1 | 8/2002 | Pozivil | 415/110 |
| 6,543,813 B1 | 4/2003 | Koberlein | 285/148.19 |
| 6,606,982 B1 * | 8/2003 | Stockhausen et al. | 123/572 |
| 6,684,869 B2 * | 2/2004 | Ponagai et al. | 123/680 |
| 6,688,103 B2 | 2/2004 | Pleuss et al. | 60/605.3 |
| 6,808,552 B2 | 10/2004 | Borla | 55/385.3 |
| 2002/0011238 A1 * | 1/2002 | Yomogida | 123/491 |
| 2003/0017765 A1 | 1/2003 | Gokan | |
| 2003/0072694 A1 | 4/2003 | Hodgson et al. | 422/180 |
| 2003/0132063 A1 | 7/2003 | Maier et al. | 184/1.5 |
| 2005/0161944 A1 | 7/2005 | Woods | 285/133.11 |
| 2006/0131817 A1 | 6/2006 | Kerelchuk | 277/592 |
| 2007/0216109 A1 | 9/2007 | Friedow | 277/593 |
| 2008/0034739 A1 | 2/2008 | Ranalli | 60/295 |

FOREIGN PATENT DOCUMENTS

| | | |
|---|---|---|
| EP | 0 289 702 | 2/1988 |
| EP | 952329 A2 | 10/1999 |
| FR | 2584778 A1 | 1/1987 |
| FR | 2684744 A1 | 6/1993 |
| JP | 55101729 A | 8/1980 |
| JP | 57146025 A | 9/1982 |
| JP | 58135325 A | 8/1983 |
| JP | 59190427 A | 10/1984 |
| JP | 60040731 A | 3/1985 |
| JP | 60104721 A | 6/1985 |
| JP | 61038126 A | 2/1986 |
| JP | 61178522 A | 8/1986 |
| JP | 62113814 A | 5/1987 |
| JP | 62233421 A | 10/1987 |
| JP | 01080720 A | 3/1989 |
| JP | 07332072 A | 12/1995 |
| JP | 10030447 A | 2/1998 |
| JP | 2002276383 A | 9/2002 |
| JP | 2005127260 A | 5/2005 |
| RU | 2082889 C | 6/1997 |
| WO | WO 00/43651 A1 | 7/2000 |
| WO | WO 03/089780 A1 | 10/2003 |

OTHER PUBLICATIONS

Duel Stage Boost Controller—Assembly Diagram.

* cited by examiner

REMOTELY MOUNTABLE TURBO SYSTEM AND METHOD OF INSTALLING

CROSS-REFERENCE TO RELATED APPLICATIONS

This application is a continuation of U.S. application Ser. No. 11/590,647 filed Oct. 30, 2006, now U.S. Pat. No. 7,469,539, which is a continuation of U.S. application Ser. No. 10/795,805, filed Mar. 8, 2004, now U.S. Pat. No. 7,134,282, which is a continuation of U.S. application Ser. No. 10/400,828, filed Mar. 27, 2003, now U.S. Pat. No. 6,745,568.

BACKGROUND

1. Field of the Invention

This invention relates generally to a turbo system used on a combustion-type engine for increasing the power of such an engine, and more specifically, to a turbo system and method of installing a turbo system on a vehicle, water craft, or other combustion-type, engine driven device or vehicle.

2. Background of the Invention

Turbo systems in the automotive industry have been available for several decades. During that period of time, there have been many advances in such turbo systems including ways to increase their efficiency and increase their effect on engine horse power.

A turbocharger utilizes the energy in the exhaust gases of an internal combustion engine to drive an impeller. The turbocharger consists of two impellers on opposite sides of a common shaft. One impeller in fluid communication with the exhaust gases of the engine functions as a fluid motor. The interaction of the flow and expansion of exhaust gases passing through the turbine impeller causes rotation of the turbine impeller and thus rotation of the shaft of the turbocharger. The other impeller, or compressor impeller, acts as an air pump to draw in ambient air, increase its velocity and density and discharge it to a pressure chamber where the energy is now higher than the energy in the ambient air. This higher pressure air is then fed into the air intake of the engine to increase the air flow into the engine.

Typically, an oil line is attached to the turbocharger housing, and feeds into bearings along the central or intermediate portion of the common shaft. This oil is then gravity fed through a lower portion of the housing into a second line, which feeds into an oil reservoir, such as the oil pan of a vehicle. As such, there is a continuous flow of lubricating oil to the bearings of the turbocharger to lubricate and thus extend the life of the bearings of the turbocharger. The oil is allowed to drain through an outlet of the turbocharger bearing housing back into the engine crankcase, which under non-accelerating conditions (e.g., when turbo shaft rpms are relatively low) may have close to atmospheric pressure conditions. Under boost conditions (e.g., when turbo shaft rpms may be in excess of 100,000 rpms and heat is being absorbed by the bearings and oil) however, during boost, crankcase pressures are substantially increased. This increase in pressure lessens the pressure differential between the inlet and outlet side of the turbocharger bearing housing, which in turn will decrease the flow of oil through the turbocharger.

It is well known that build-up of pressure in the pressure of the oil leaving the turbocharger needs to be avoided. If the oil pressure becomes great enough, some of the oil may enter the seal area immediately adjacent one or both of the impeller wheels and become mixed with the hydraulic pathways associated with the impeller wheels. Any pressure build up or restriction of the oil outlet consequently restricts inlet oil flow and results in a lower volume of lubrication across the turbocharger bearings causing damage to the bearings and shaft of the turbocharger and eventually a turbocharger failure.

In a conventional turbocharger set up, the turbocharger is placed at or near the top of the oiling system which allows gravity to drain substantially all of the oil from the turbocharger and associated fittings, oil inlet and outlet lines and hoses. This conventional turbocharger installation method results in a "dry" condition upon engine startup. Thus, the turbocharger can begin spinning at relatively high rpms without adequate lubrication until lubricating oil finally reaches the turbocharger. Spinning the turbocharger without adequate lubrication can cause increased wear of bearings and other components and result in premature failure of the turbocharger.

Because of the well-known problems associated with oil pressure build up inside the turbocharger, there have been attempts in the art to provide various methods of addressing this issue. For example, in U.S. Pat. No. 4,142,608, part of the high-pressure exhaust gas is permitted to escape through a bleed in a seal which is associated with the motor impeller. Thus, according to the invention, the flow of oil is assisted because of the tendency of the bled exhaust gas to carry the exhaust oil in the same direction due to a pressure differential.

Consistent with the advances in turbocharger technology and the known problems associated with any buildup of oil pressure of oil leaving the turbocharger, it is standard practice to mount the turbocharger next to the engine block well above the oil level to facilitate unrestricted gravity draining of oil from the turbocharger back to the oil pan reservoir. In addition, because the turbocharger is connected to the engine exhaust, the turbocharger is commonly mounted directly on or adjacent to the exhaust manifold so as to make the exhaust gas interconnection between the exhaust manifold and the turbocharger more easily connected. Because of the close proximity of the turbocharger to the exhaust manifold at a point where the engine gases are still extremely hot, the turbocharger receives engine gases that are still burning as they enter the turbocharger. Accordingly, the internal temperatures of a turbocharger are typically close to those of the engines combustion chamber. Such heat surely shortens the life of a turbocharger, as heated components tend to wear more rapidly as lubricants are typically less effective at higher temperatures.

Conventional turbocharger installations are quite difficult due to the lack of space under the hood of most modern vehicles. Installing an aftermarket turbocharger system into an already overcrowded engine compartment most often necessitates the relocation of many factory-installed components to make room for the turbocharger system. Such relocation of equipment significantly adds to the expense of conventional turbocharger installations. The addition of all of these extra components and extra plumbing required to mount a traditional turbocharger system under the hood severely overcrowds an already crowded engine compartment making it extremely difficult to do the standard maintenance and any repair work required to keep the vehicle in good condition and greatly increases the labor costs associated with any future maintenance or repairs needed to be performed.

In addition, extreme under-hood temperatures are generated by turbochargers sometimes causing the cooling system of the vehicle to exceed its capabilities and require that a cooling system upgrade be performed as well. Furthermore, these extreme under-hood temperatures can effect various plastic and rubber engine and vehicle components by causing them to fail. To prevent such overheating of auxiliary components near the turbocharger, expensive heat shielding is added around the turbocharger. While protecting auxiliary components surrounding the turbocharger, such shielding compounds the temperature of the turbocharger itself by preventing, to some extent, the dissipation of heat from the turbocharger. In point of fact, turbocharger temperatures can become so extreme during aggressive driving conditions that the turbocharger bearings can be detrimentally affected unless the turbocharger is allowed to cool down for a period of time with the engine idling before the engine is shut off.

Heating air causes air expansion, which creates a "false pressure" (increase in pressure without an increase in air volume). Horsepower is lost at a ratio of approximately 1 HP per Degree Fahrenheit (within certain limits). In an attempt to combat high charge air temperatures and the consequent horsepower losses which are a result of extreme turbocharger temperatures, most typical turbocharger applications utilize an intercooler mounted in front of the radiator. The intercooler removes excess heat from the intake charge air that comes out of the turbocharger compressor. The intercooled intake charge adds additional power by providing cooler, denser air to the engine. An intercooler, however, causes a restriction in the flow of charge air creating a pressure differential across the intercooler. Accordingly, the compressor needs to make several pounds more boost than actually enters the engine to overcome the pressure drop across the intercooler. Moreover, compressing the air to a higher pressure causes further heating of the already hot air. Thus, the added demands on the turbocharger compressor further increase the operating temperature of the turbocharger.

As with the installation of a turbocharger, the installation of intercooler components is expensive and sometimes difficult to mount because of their size and the limited space available in front of the radiator of modern vehicles. Many times, the only room to mount the intercooler is below the radiator (near the ground. This exposes the expensive and fragile intercooler to damaging road debris that can clog and restrict the flow of the air through the intercooler, reducing its cooling capacity and efficiency.

The present invention of a turbo system overcomes the above-discussed drawbacks of prior art turbo systems to provide a more efficient, easier installing, and less expensive turbo system alternative.

SUMMARY OF THE INVENTION

Accordingly, a remotely mountable turbo system is configured for mounting along the exhaust of an internal combustion engine regardless of whether the turbocharger is above, at or below the oil level of the oil reservoir of the engine. The turbo system is comprised of a turbocharger that is coupled to the engine exhaust. More specifically, as with a conventional turbocharger, the exhaust is coupled to the turbocharger so as to drive the turbine impeller of the turbocharger causing rotation of the compressor impeller.

As the compressor impeller spins, outside air is pulled into the compressor and fed to the engine intake, throttle body or carburetor. In order to minimize debris entering the compressor, an air filter is coupled to the air intake of the compressor. In one embodiment, the air filter is located in a position where it will not be exposed to the elements that may otherwise require premature replacement of the air filter once air flow is significantly restricted by the collection of various particles and away from the heat of the engine.

In one embodiment, the oil for the turbocharger is supplied through a high-pressure line from an engine oil pressure supply. The oil is then evacuated from the turbocharger via an oil pump. The oil pump then pumps the oil from the turbocharger back to the oil pan, crankcase or other oil reservoir of the engine.

Remote mounting of the turbocharger of the present invention is to a large extent dependent upon the proper removal of oil from the bearing housing after it passes through the bearings. The pump of the present invention is capable of effectively pumping oil in all operating temperature ranges from the extreme cold of startup in winter to the extreme hot experienced during full boost conditions in the heat of summer. The pump has a near 100% duty cycle so that it can perform effectively during extended driving. The pump is compact, self contained and operable by an integral 12-volt DC motor for easy connection to a vehicle's 12-volt electrical system. In one embodiment, the oil pump is a 12-volt gear pump.

The oil pump creates a "vacuum" or "suction" effect on the outlet side of the turbocharger. Thus, a pressure differential is created between the inlet and outlet sides of the turbocharger bearing housing. As such, a more free exchange or flow of oil is created (compared to the gravity fed systems of the prior art) through the turbocharger bearings resulting in more efficient lubrication of the turbocharger bearings.

Use of an electric oil pump to pump oil from the turbocharger outlet to the crankcase of the engine (for example), allows for installation of a turbocharger system in accordance with the present invention on engines that may not have an engine oiling system capable of handling a turbocharger or no oiling system at all. For example, some two stroke engines use oil mixed with the fuel to lubricate the engine.

In an alternative embodiment, use of an oil pump of the present invention on such engines is incorporated by also including a separate oil sump and oil cooler that will provide the turbocharger with its own self-contained oiling system. Thus, the turbocharger of the present invention may be installed on virtually any gas or diesel powered engine, even those where conventional turbo systems are not suitable or even possible.

In one embodiment, the turbocharger is mounted at the location of the muffler of a conventional automobile. Because of the noise reducing effects of the turbocharger, the muffler of the vehicle may be completely replaced with the turbocharger. In the alternative, a smaller supplemental muffler may be coupled to the exhaust port of the turbine to further reduce exhaust noise. By mounting the turbocharger at the location of the stock muffler, modifications within the engine compartment that may otherwise be required to create space for an engine-mounted turbocharger can be avoided. In most cases, the turbocharger installation of the present invention results in less crowding of the engine compartment than the stock vehicle before the installation, creating more access room to facilitate and lower the costs of maintenance or repair work required to be performed on the vehicle. Furthermore, the space for the stock muffler is generally sufficient space for mounting of the turbocharger once the stock muffler is removed.

When mounting the turbocharger at the location of the stock muffler, for example, the oil line into the turbocharger will most likely be below the oil level of the engine. As such, a check valve is installed in the oil feed line. For example, a 5 psi check valve will ensure that the engine is running to prevent engine oil from draining into the turbocharger when the engine is not running. When the engine is started, the oil feed line will pressurize and cause the check valve to open as exhaust flows into the intake turbine. The use of the check valve to maintain oil between the engines oil pump and the turbocharger creates a "wet" condition upon startup which quickly lubricates the turbocharger upon engine startup. In a conventional turbocharger installation, the turbocharger is placed at the "top" of the oil system which causes gravity to evacuate the lubricating oil from the turbocharger, fittings, lines, and hoses when the engine is turned off. Upon engine startup, prior art turbo systems can run for a period time in a "dry" state until oil is circulated back to the turbocharger. Thus, the turbocharger turbines and shaft can be spinning at high rpms without proper lubrication effecting bearing and shaft life of the turbocharger.

In another embodiment, a wastegate valve is coupled to the exhaust prior to entry into the turbine. The wastegate opens with boost pressure to bypass exhaust around the turbocharger to slow the turbine impeller and thus control boost. Without the wastegate, the compounding effect of the exhaust with boost could cause the boost pressure to rise exponentially with engine rpm. Smaller turbine housings produce adequate boost at lower rpms but produce uncontrollably high boost at high rpms. Larger turbine housings produce little or no boost at lower rpms, but efficient boost at higher rpms. The wastegate allows use of smaller turbine housings to obtain low rpm boost and power while controlling the boost limit as rpm increases to prevent the compounding effect that could otherwise occur as engine rpm increases.

By mounting the turbocharger away from the exhaust manifold of the engine, the temperature of the exhaust can be significantly decreased before it enters the turbocharger. Heat is a major drawback of conventional turbocharger systems. The restriction of the exhaust flow causes excess heat to build up in the exhaust system. Since the turbocharger turbine and compressor are integrally connected, much of this excess exhaust heat is transferred from the turbine side to the compressor side and consequently into the compressor intake air. Such heat transfer significantly reduces the efficiency of the turbocharger.

As it is typical to mount turbochargers directly onto the exhaust manifold of the engine, the exhaust entering the turbocharger is extremely hot and often still "flaming," causing extreme turbocharger temperatures. Conversely, mounting the turbocharger at the rear of the vehicle according to the present invention, allows the exhaust heat to dissipate as it flows through the exhaust system which cools down and stabilizes the gases before they enter the turbine. This greatly reduces the turbocharger temperature thereby increasing the consistency of the flow of gases through the turbocharger, and ultimately, the turbocharger performance and efficiency. Furthermore, mounting the turbocharger under the vehicle instead of under the hood where temperatures sometimes exceed 300 degrees Fahrenheit, as is the conventional mounting location, allows a higher volume of cold air to circulate around the turbocharger and related exhaust components to increase the cooling of these components. Such cooler turbocharger temperatures create less stress on the bearings of the turbocharger and related components as well as less heat effects on the engine oil and less heat transfer from the turbine to the compressor, ultimately, producing a cooler charge air.

Because of the ability to mount the turbocharger of the present invention at a location away from the engine at a downstream point along the engine exhaust pipe, the entire system operates at cooler temperatures than an engine mounted turbo system. Specifically, both the exhaust gases entering the turbocharger of the present invention and the compressed air charge exiting the turbocharger are cooler in temperature. The turbo system of the present invention produces its own "intercooling effect" by cooling down the already cooler than normal intake charge of air via heat dissipation produced by the extensive charge air duct surface area. Unlike a traditional intercooler, the turbo system of the present invention does not create a pressure differential to achieve the intercooling effect and thus does not require the turbocharger to increase boost pressure to compensate for the pressure drop across a conventional intercooler.

In addition, with the remote mounting of the turbocharger of the present invention, as for example under the vehicle where there is ample room, the expensive major modifications often necessary to create space under the hood in the engine compartment are significantly, if not totally, eliminated. Consequently, the elimination of these major modifications and added equipment under the hood dramatically lowers the cost of the installation and greatly reduces the costs of future maintenance and repair work required.

Moreover, remote mounting of the turbocharger of the present invention also has the result of a larger volume of engine oil. That is, engine oil contained in hoses, tubing, fittings and the pump provides additional oil to the oil system of the vehicle, reducing the frequency with which the engine oil has to pass through the turbocharger and engine components that primarily effect the lubricating capabilities of the oil. Moreover, the oil lines to and from the turbocharger function as engine oil coolers to lower the temperature of the engine oil, which in turn help to further cool the temperatures of the turbocharger, related components, and ultimately the intake air charge.

In one embodiment of the invention, a check valve is disposed between the engine oil source and the turbocharger near the turbocharger. The check valve creates a "wet" condition upon start up which allows rapid lubrication of the turbocharger upon engine start up.

In another embodiment, a pump controller is provided to help match the speed of the pump to the oil removal needs of the turbocharger. That is, as oil pressure within the system increases with increased engine rpm, more oil will enter the turbocharger. At lower engine rpms, the oil removal requirements for the pump are decreased with the decrease of oil pressure on the pressure side of the vehicle's oiling system. Because a pump in accordance with the present invention may produce pump noise during operation, the controller can significantly reduce such pump noise when engine rpms are relatively low, and increase the pump speed as needed along with engine speed. Furthermore, the noise produced by the increased engine speed from the engine itself will help drown out or overcome the noise produced by the pump at such higher engine rpms.

DETAILED DESCRIPTION

Figure 1A:
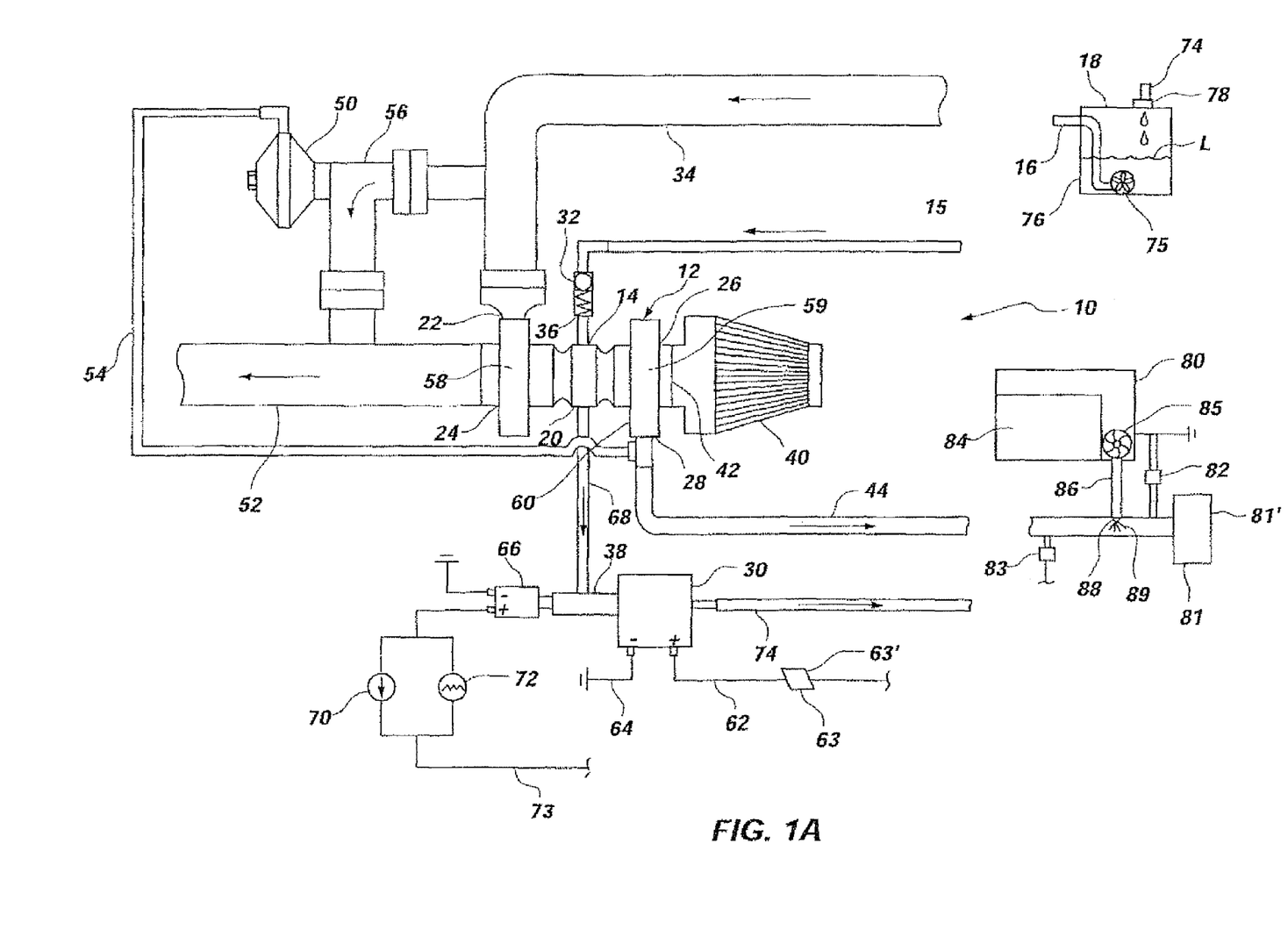
FIG. 1A is a side view of a first embodiment of a turbocharger system in accordance with the principles of the present invention.

Referring to FIG. 1A, a turbocharger system, generally indicated at 10, for use with a combustion engine (not shown), is comprised of a turbocharger 12 having an oil inlet 14 configured for being coupled to the pressure side 16 of the oil pump 75 of an oiling system 18; and an oil outlet 20. The turbocharger 12 also includes an exhaust inlet 22 and outlet 24 on the turbine 58 and an ambient air inlet 26 and a charge air outlet 28 on the compressor 59. An oil pump 30 in fluid communication with the oil outlet 20 is configured for being in fluid communication with the oiling system 18, A pressure driven check valve 32 is coupled to the oil inlet 14 of the turbocharger 12 and in fluid communication therewith. The check valve 32 is configured to prevent the flow of oil from the pressure side 16 of the oiling system 18 into the turbocharger when the pressure on the pressure side 16 of the oiling system 18 drops below a predetermined level. For example, a 5-psi check valve will close when the pressure on the pressure side 16 drops below 5-psi, indicating that the engine has been shut off. The outlet 36 of the check valve 32 is positioned above the oil inlet 14 of the turbocharger 12 and the inlet 38 of the oil pump 30 is positioned preferably but not necessarily below the oil outlet 20 of the turbocharger 12. This ensures that oil entering the turbocharger system 10 from the pressure side 16 of the oiling system 18 is allowed to freely flow into and out of the turbocharger 12 during turbocharger operation. This system also prevents gravity from draining any residual oil contained within the engine or oil pressure lines connected to the turbocharger 12 when the system is off. This prevents the possibility of a "dry" start-up condition.

As will be discussed in more detail, the turbocharger system 10 may be mounted relative to the vehicle with variously configured mounting hardware depending upon the type of vehicle and the mounting location. In any event, the turbocharger system 10 of the present invention is configured for mounting to an existing exhaust pipe 34 of a vehicle; away from the engine (not shown) and at or below the oil level L of the oiling system 18. As will be described in more detail, in one embodiment of the present invention, the hardware for mounting the turbocharger is configured for mounting the turbocharger 12 at the location of a vehicle's existing muffler.

The turbocharger system 10 also includes an air filter 40 for providing clean air into the compressor side of the turbocharger 12 through the air charge inlet 42. The air filter 40 provides clean air into the turbocharger 12 and thus through the ducting 44 that leads into the intake manifold (not shown) of the engine. Likewise, as will be shown in more detail, the air filter 40 may be positioned at a more remote location, such as in the fender well of a vehicle, and connected to the air charge inlet 42 through various ducting. By locating the air filter in a location that is at least partially isolated from road debris and other environmental elements, the useful life of the air filter can be prolonged.

Figure 1B:
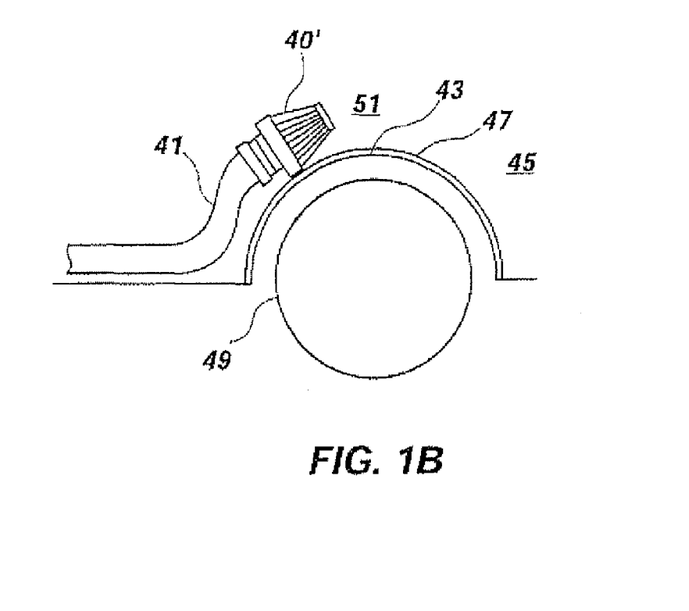
FIG. 1B is a side view of a remotely mounted air filter in accordance with the principles of the present invention.

As illustrated in FIG. 1B, an air filter 40' is coupled to various ducting 41 and mounted within the fender well 43 of the vehicle 45. In many modern vehicles, a plastic liner 47 is positioned within the fender well to at least partially prevent debris gathered by the vehicle's tire 49 from entering the space 51 above the liner 47. As such, this space 51 is adequate for positioning of the air filter 401 while keeping it at least partially isolated from road debris. This location also provides relatively easy access to the air filter 40' when replacement of the filter 40' with a clean one is desired.

Referring again to FIG. 1A, a wastegate 50 is coupled between the vehicle exhaust line 34 coming from the exhaust manifold (not shown) of the engine and the exhaust 52, which is coupled to the exhaust outlet 24 of the turbocharger 12. Boost pressure of the air charge line 44 is provided to the wastegate 50 through boost pressure line 54. Thus, the wastegate 50 is provided to control the boost pressure of the turbocharger 12. The wastegate 50 opens the line 56 between the manifold exhaust line 34 and the turbocharger exhaust line 52 according to the boost pressure in the air charge line 44.

Figure 1C:
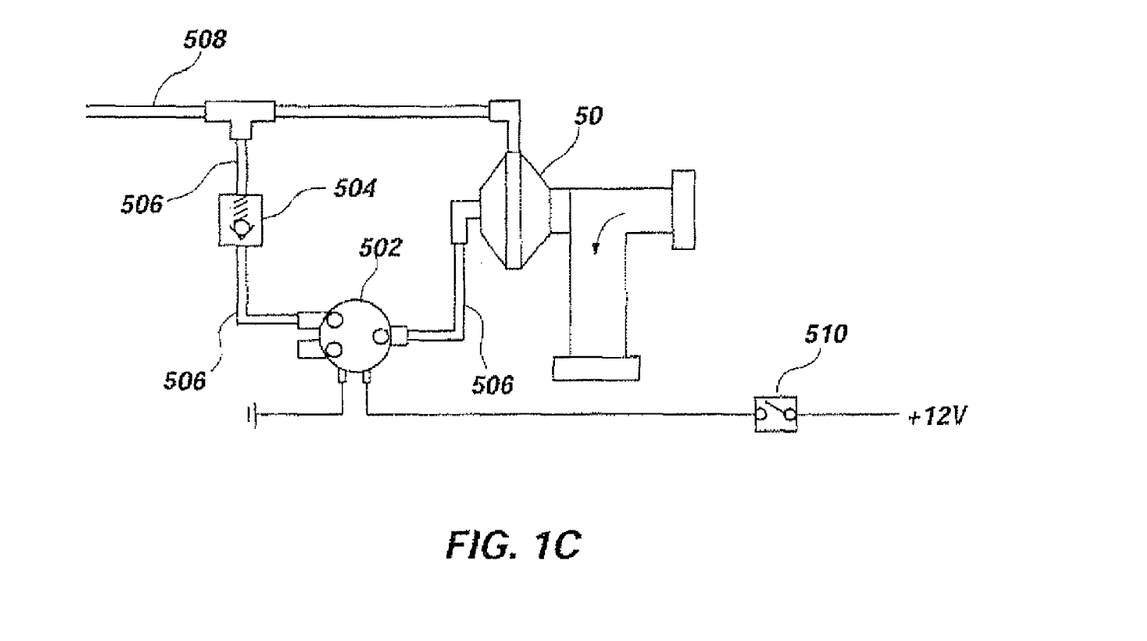
FIG. 1C is a side view of a boost control system to regulate the spring rate and pressure of a wastegate from inside the vehicle while driving in accordance with the principles of the present invention.

As further illustrated in FIG. 1C, the wastegate 50 is controlled by a wastegate control system comprising a two-way valve 502 and a pressure regulator 504 coupled by pressure hoses 506 to pressure hose 508 which is in fluid communication with boost pressure of the air charge tube. The switch 510 may be mounted inside the vehicle allowing access from the driver's seat (not shown). Switch 510 supplies voltage to valve 502 which then switches to allow set regulated air pressure to assist wastegate spring pressure and raise boost pressure of wastegate 50. The wastegate controller allows the wastegate 50 to be adjusted from inside the vehicle ("on the fly"). The wastegate 50 opens to bypass the exhaust when internal spring pressure is overcome by boost pressure. This internal spring can be changed to provide different ranges of boost pressures. By assisting the spring with regulated boost pressure more or less "spring pressure" can be added to increase or decrease boost without changing the wastegate spring.

Again, in reference to FIG. 1A, the opening of the wastegate 50 and thus the line 56, allows exhaust (indicated by the arrow) to bypass the turbocharger 12. As such, the turbine impeller will be slowed, thus slowing the rotation of the compressor impeller 60 and decreasing boost. Without the wastegate 50, the compounding effect of the exhaust with boost would cause the boost to rise exponentially with engine speed or rpm.

While smaller turbocharger turbine housings produce boost at lower rpms, they also often produce uncontrollably high boost at high engine rpms. Larger turbocharger turbine housings, on the other hand, produce little or no boost at lower rpms, but efficient boost at higher rpms. The wastegate 50 allows use of smaller turbocharger turbine housings to obtain low rpm boost and power while controlling the boost limit as rpm increases to prevent the compounding effect that would otherwise occur as engine rpm increases.

As illustrated in FIG. 1A, the oiling system 18 may be the oiling system for lubrication of the vehicle's engine or a separate oiling system 18 that is provided to supply oil to the turbocharger 12, separate and apart from the vehicle's oiling system. The oil pump 30 is in fluid communication with the oil outlet 20 of the turbocharger 12 and the oil inlet of the oil pump 30, and as previously discussed, is near the oil outlet 20 of the turbocharger so that oil fed to the turbocharger 12 can be evacuated out of the turbocharger 12 into the oil pump inlet 38. In the illustrated embodiment the oil pump 30 is an electric oil pump, such as a 12 volt electric gear pump capable of pumping 3 gallons/minute oil flow and continuous use. The terminal 62 is coupled to the ignition of the vehicle through voltage controller 63 which may include a relay 63', to regulate the speed, volume, and noise output of the pump 30. Terminal 64 is coupled to the ground of the vehicle. Thus, when the vehicle's ignition is turned to an on position and the engine is running, the pump 30 will also turn on.

The pump controller 63 matches the speed of the pump 30 to the oil removal needs of the turbocharger 12. That is, as oil pressure within the system increases with increased engine rpm, more oil will enter the turbocharger 12. At lower engine rpms, the oil removal requirements for the pump 30 are decreased with the decrease of oil pressure on the pressure side of the vehicle's oiling system. When using a gear pump in particular, the pump 30 will produce cabin noise during operation, the pump controller 63 can significantly reduce such pump noise when engine rpms are relatively low, and increase the pump speed as needed along with engine speed. Furthermore, the noise produced by the increased engine speed from the engine itself will help drown out or overcome the noise produced by the pump 30 at such higher engine rpms. It should be noted that while an electrical gear pump is discussed with reference to FIG. 1A, those of skill in the art will appreciate that other pumps may be employed in accordance with the principles of the present invention.

A pressure switch 66 is coupled to the oil inlet 38 to the oil pump 30 to monitor oil pressure within the oil line 68 coming from the oil outlet 20 of the turbocharger 12. The pressure switch 66 is provided to detect pressure rise within the oil line 68 that would indicate a malfunction of the oil pump 30 in that oil pressure would be building in the oil line 68 and ultimately within the turbocharger. The pressure switch 66 is coupled to audible and visual alarms 70 and 72, respectively, (powered by the vehicle's battery through wire 73) positioned to warn an operator of the vehicle that there is a malfunction in the system 10. The operator can then choose to disengage the turbocharger system 10 from operation, thus preventing any damage thereto.

Oil pumped by the oil pump 30 is pumped through feed line 74 and into the oil reservoir 76 of the oiling system 18 through a specially configured oil cap 78 configured for receiving and maintaining the feed line 74 relative thereto. It should be noted that while the oiling system 18 is simplistically depicted in FIG. 1, those of skill in the art will appreciate that oiling systems, such as those provided in automobiles are comprised of various complex components to provide adequate lubrication to the engine components of the automobile.

A water injection system 80 coupled to the air charge line 44 is provided to help cool the air charge before entering the intake manifold 81, which may comprise a throttle body 81', to prevent detonation. The mist 89, which may be comprised of water or a water/alcohol mixture, atomizes in the intake manifold 81 and causes an evaporative cooling effect to lower intake air temperatures and lower combustion temperatures. The water injection system 80 includes a pressure switch 82, such as a 5 psi pressure switch to detect pressure within the charge air tube 44 before injecting water. The injection system 80 also includes a water reservoir 84 with a high-pressure pump 85 for injecting and various tubing 86 for coupling the system 80 to a spray injector 88.

Figure 2A:
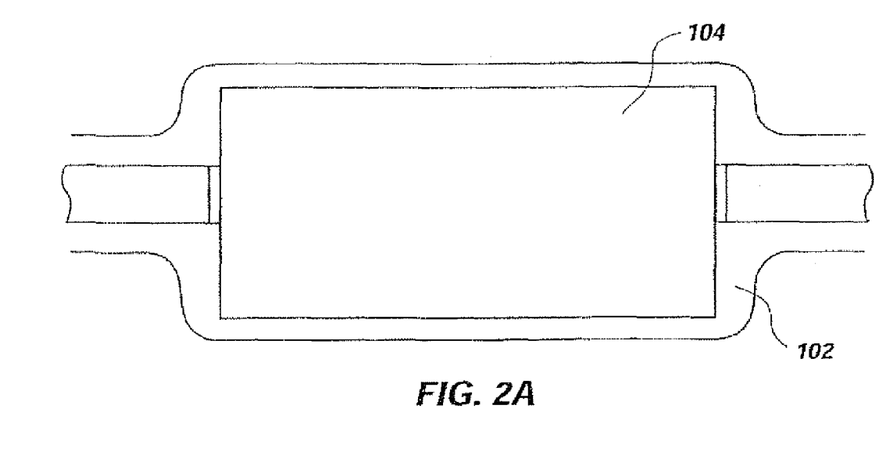
FIG. 2A is a bottom view of a factory installed muffler, installed to the underside of a vehicle.
Figure 2B:
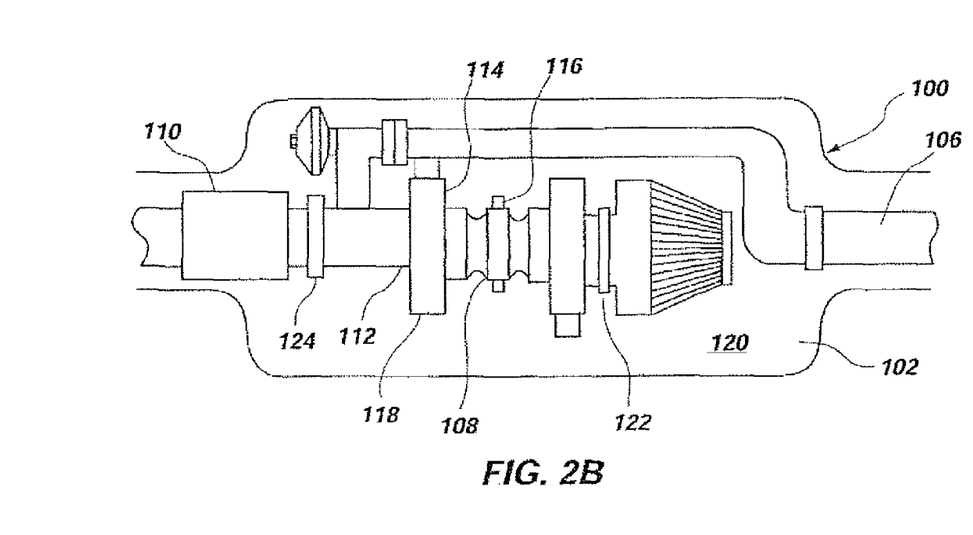
FIG. 2B is a bottom view of a second embodiment of a turbocharger system mounted in the location vacated upon removal of the muffler illustrated in FIG. 2A in accordance with the principles of the present invention.

As illustrated in FIGS. 2A and 2B, a turbocharger system 100, in accordance with the principles of the present invention, is configured to be mounted within the space 102 provided in the underside of the vehicle normally provided to house at least a portion of the muffler 104. By removing the muffler 104, the turbocharger system 100 can be coupled to the exhaust line 106 coming from the exhaust manifold of the vehicles engine at a location remote from the engine compartment of the vehicle. In addition, such remote mounting virtually eliminates the need for reconfiguring engine compartment components to accommodate the turbocharger system 100 of the present invention.

Because of the muffling effects of the turbocharger 108, the muffler of the vehicle may be completely eliminated and replaced with the turbocharger 108. In the alternative, a supplemental, yet smaller, muffler 110, such as a "performance muffler," may be coupled to the exhaust port 112 of the turbine 118.

When mounting the turbocharger 108 at the location of the stock muffler 104, the oil line 116 into the turbocharger 108 will typically be below the oil level of the engine's oiling system (not shown). As such, as previously described, the check valve and oil pump are provided to regulate oil into and out of the turbocharger 108 to ensure a free flow of oil through the turbocharger 108 when the turbocharger 108 is in operation.

Thus, when the engine is started, the oil feed line will pressurize and cause the check valve to open as exhaust flows into the turbine 118. The use of the check valve to maintain oil between the engines oil pump and the turbocharger creates a "wet" condition upon start-up which quickly lubricates the bearings (not visible) of the turbocharger 108 upon engine startup.

The turbocharger system 100 is mounted relative to the vehicle 120 with various mounting hardware, such as brackets 122 and 124 to couple the turbocharger 108 to the underside of the vehicle 120.

Figure 3A:
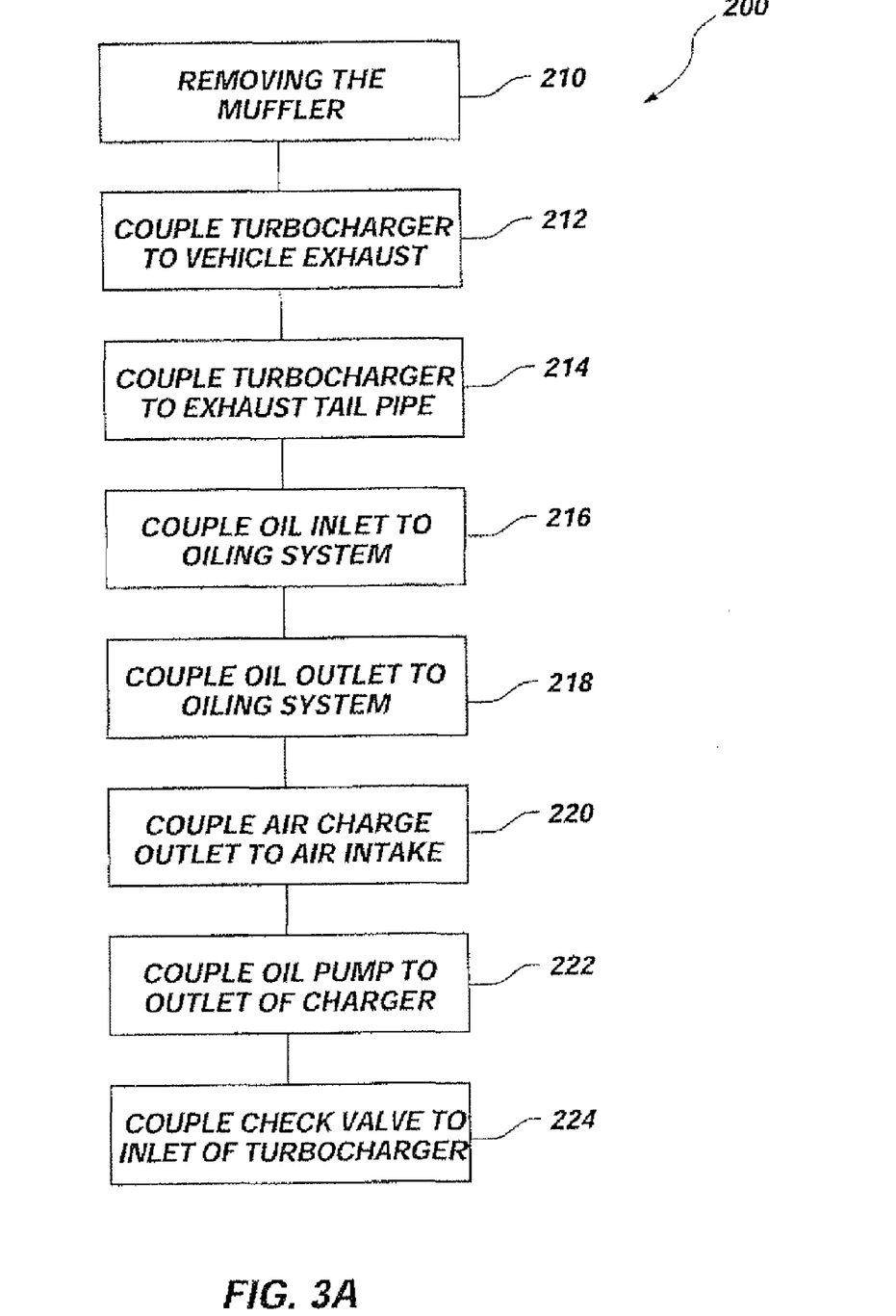
FIG. 3A is a schematic flow diagram of a first embodiment of a method of installing a turbocharger system in accordance with the principles of the present invention.
Figure 3B:
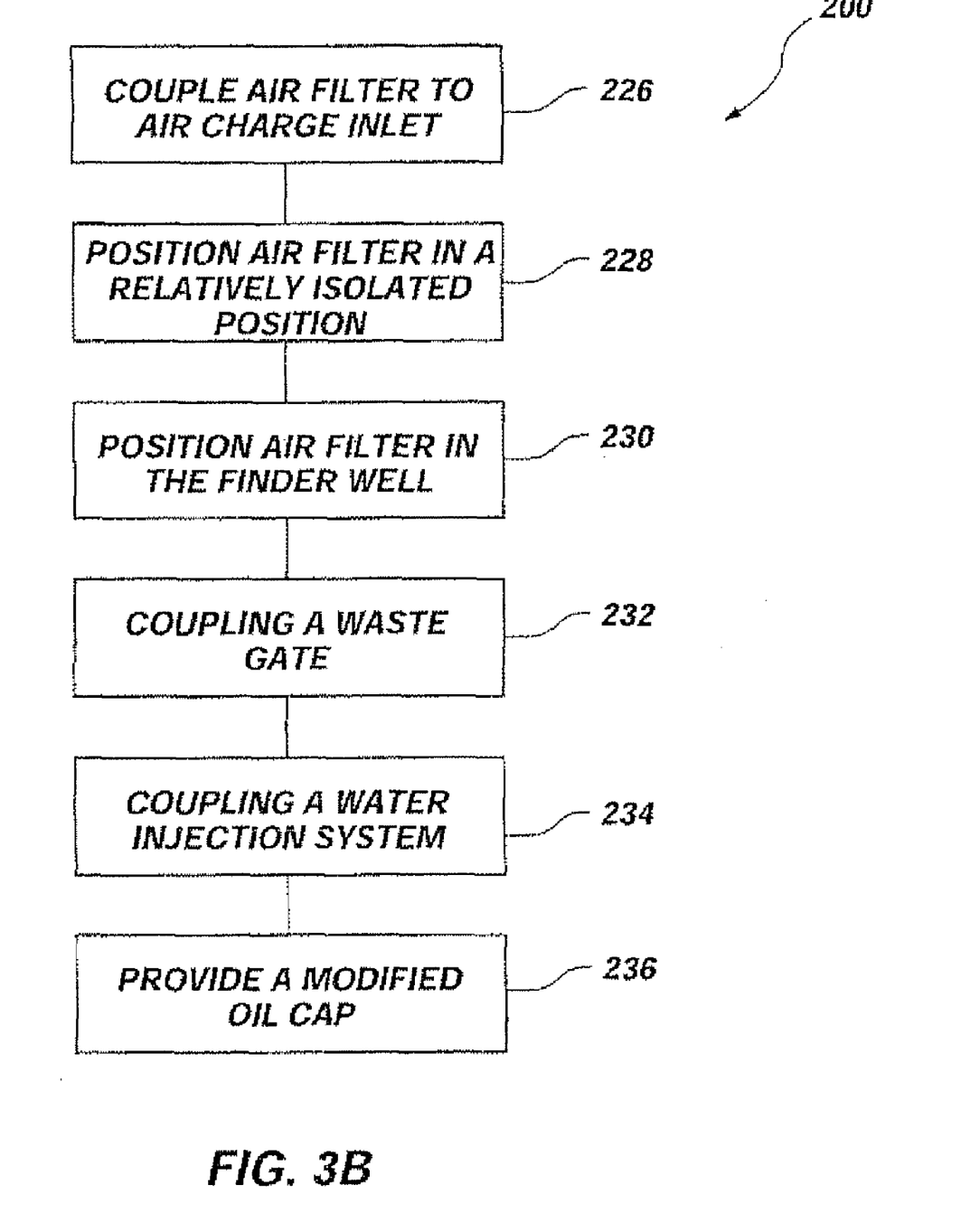
FIG. 3B is a continuation of the schematic flow diagram illustrated in FIG. 3A illustrating a method of installing a turbocharger system in accordance with the principles of the present invention.

The basic steps of a method 200 of installing such a turbocharger system to a vehicle as illustrated in FIGS. 3A and 3B. The method of installing includes the steps of removing 210 an existing muffler of the vehicle and mounting a turbocharger system in accordance with the present invention in its place. Once the existing muffler is removed, an exhaust inlet of the turbocharger is mounted or coupled 212 to the exhaust system of the vehicle at a location at or below the oil level of the vehicle. An exhaust outlet of the turbocharger is coupled 214 to what is commonly referred to as a "tail pipe." The oil inlet of the turbocharger is coupled 216 to a pressure side of the vehicle's oiling system. The oil outlet of the turbocharger is coupled 218 to the oil reservoir of the oiling system at a position above the oil level. An air charge outlet of the turbocharger is coupled 220 the air intake of the vehicle, whether that be a throttle body, etc.

An oil pump is coupled 222 between the oil outlet of the turbocharger and the reservoir side of the oiling system of the vehicle. The oil pump is positioned near the turbocharger so that oil flowing into the turbocharger for lubrication of its bearings can freely flow out of the turbocharger without any build up of back pressure. A check valve is coupled 224 to the oil inlet of the turbocharger. As previously discussed, the check valve is provided to regulate flow of oil into the turbocharger only when there is pressure in the oiling system of the vehicle to which the check valve is connected, indicating that the engine is running.

As further illustrated in FIG. 3B, the method 200 of installing the turbo system further comprises coupling 226 an air filter to the air charge inlet of the turbocharger. This may include positioning 228 the air filter at a location that is relatively isolated from road debris or other contaminants, such as weather elements. In such positioning 228, it may be desirable to position 230 the air filter in the fender well of the vehicle.

The method 200 further includes coupling 232 a wastegate between the exhaust system of the vehicle at a location before the exhaust inlet of the turbocharger and a tail pipe of the vehicle.

The method 200 further comprises coupling 234 a water injection system to the turbocharger for injecting water into the flow of gases exiting the turbocharger compressor to cool the intake charge and reduce combustion temperatures.

In addition, the method 200 may include providing 236 a modified engine oil fill cap with fittings to couple to an oil return line extending between the oil pump and the fill cap.

Thus, in summary, the vehicle exhaust system is removed from the muffler to the rear of the vehicle, while leaving any emission equipment (such as the vehicles catalytic converter) in place. A new exhaust system with the turbocharger is installed into the stock mounts and exhaust flanges. The oil pressure sending unit of the vehicle is removed and reinstalled with a T fitting and an oil pressure line. The oil pressure line is extended to the turbocharger with a check valve installed at the turbocharger. An electric oil pump is mounted to the frame of the vehicle near the turbocharger. Oil return hoses and fittings run from the turbocharger outlet to the oil pump inlet so that the oil is evacuated from the turbocharger by the oil pump. An oil pump outlet hose is extended back to the engine into an engine oil fill cap.

An electrical harness is installed to the battery, ignition positive or fuel pump positive, ground and oil pump. The stock air box and ducting to the throttle body is removed. Ducting is installed from the turbocharger to the engine's intake manifold throttle body. The vehicles Mass Air Flow sensor 83 (see FIG. 1A) (if applicable) is plumbed inline in the duct 44 or removed and installed into a custom tuned duct piece. A PCV (Positive Crankcase Ventilation) vent filter is installed in the PCV hose if the O.E. design is plumbed into the stock air box). If the stock PCV hose is plumbed into "Metered" air, this hose is then plumbed into the charge air tube (after the MAF sensor) with an inline 2-way valve operated via a pressure switch. A pressure hose is installed from the charge air duct, intake manifold, or exhaust in front of turbocharger to the fuel pressure regulator (depending on fuel pressure requirements). Finally, the vehicle is tested for proper tuning, fuel mixture and drivability.

It should be noted that while the method 200 is shown and described in a particular order, those of skill in the art will appreciate that the various components of the turbocharger system of the present invention may be installed in any desirable order.

Figure 4A:
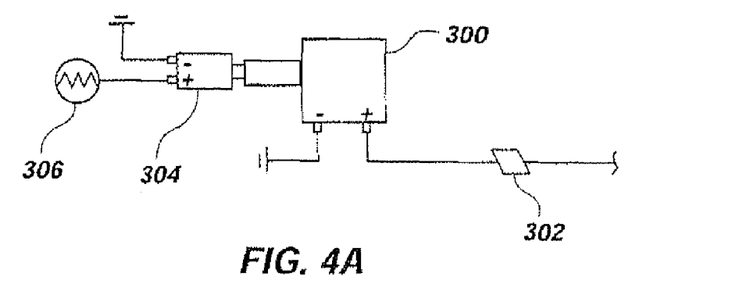
FIG. 4A is a side view of an oil pump, pressure switch, and alarm system in accordance with the principles of the present invention.
Figure 4B:
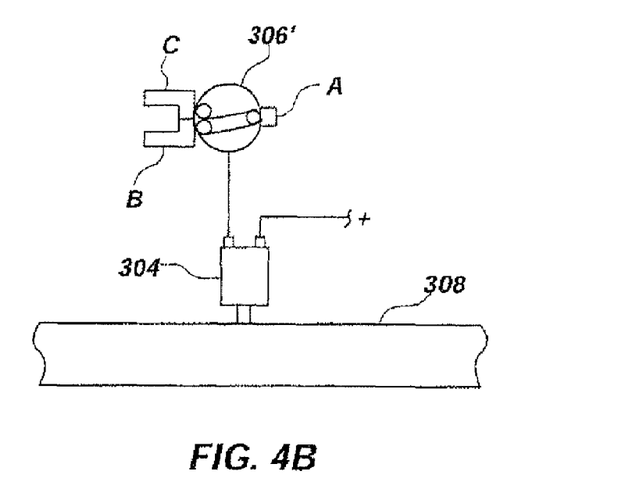
FIG. 4B is a side view of a pressure switch and two-way valve system to control PCV functions in accordance with the principles of the present invention.

Referring now to FIG. 4A, there is illustrated an electric oil pump 300 in accordance with the present invention. Coupled to the pump 300 is a pressure switch 304 coupled to a warning indicator or alarm system 306 which is located as to be seen or heard by the driver. Also coupled to the pump 300 is a variable voltage controller 302 used to slow down the oil pump 300 at low speeds and on start-up. Such a variable voltage controller 302 is particularly useful when using a gear pump; as such gear pumps are inherently very noisy and thus audibly detectable within the vehicle. The variable voltage controller 302 varies the voltage to the pump 300, and thus its operational speed depending upon the oil removal demands of the turbocharger. That is, when oil flow requirements are low, as at low engine rpm, the pump is slowed to eliminate virtually all of the typical noise associated with operation of the pump. Conversely, when oil flow requirements are high, the speed of the pump is increased to adequately pump all of the oil draining from the turbocharger back to the oil system of the vehicle. At such high oil flow periods, the engine is typically making such noise that the typical noise generated by the pump is not noticeable.

illustrated in FIG. 4B is the use of a two-way valve 306 operated by the pressure switch 304 connected to air charge tube 308. The valve 306 allows the PCV (Positive Crankcase Ventilation) system (port A) to draw metered air in through the crankcase (not shown) and back into the intake manifold (port B) (emissions equipment) (not shown). To prevent boost pressure from entering the crankcase under boost conditions, the two-way valve is vented to the atmosphere (port C) when switch 304 detects boost pressure in tube 308. Thus, the PCV system will not pressurize the crankcase at WOT or under boost conditions. The valve also allows the crankcase to still be vented and prevents pressurizing of crankcase which can cause oil leakage and gasket and seal failures.

Figure 5:
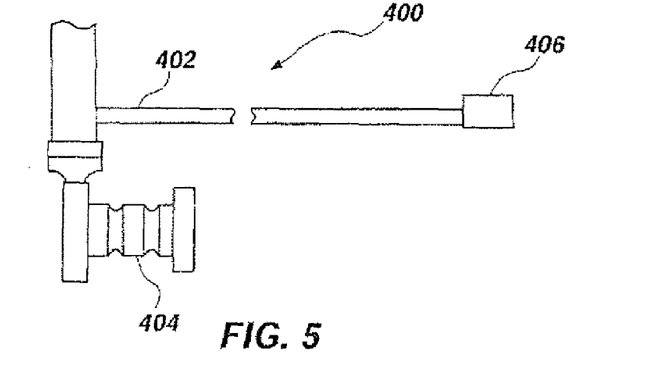
FIG. 5 is a partial side view of a third embodiment of a turbocharger system in accordance with the principles of the present invention.

As illustrated in FIG. 5 is a system 400 for raising the fuel pressure to meet the higher fuel demands of the turbocharger system in accordance with the present invention that can exceed the stock fuel system. Most turbocharger systems often use boost plumbed into a fuel pressure regulator to raise the fuel pressure at a 1:1 ratio with boost increases. Such systems usually work fine for low boost applications over most of the rpm range. With higher boost applications, however and higher rpm ranges, however, it is usually necessary to change the O.E. fuel system components and upgrade them with higher pressure and flow fuel pumps and injectors or even a FMU (fuel management unit). Such after-market fuel system components are relatively expensive and thus significantly increase the cost of installing a turbocharger system.

In accordance with the present invention, exhaust pressure is plumbed with tubing 402. The exhaust pressure is plumbed from a location in front of the turbocharger 404 to a fuel pressure regulator 406 which will exponentially increase the fuel pressure in the higher boost and rpm ranges by adding air pressure to the spring side of the regulator diaphragm to increase the spring rate. When the boost pressure is around 7 psi and rpms are above 4000, exhaust pressure can exceed 20 psi. Thus, instead of raising the fuel pressure by 7 psi, the system 400 can raise the fuel pressure by 20 psi and utilize the full potential of the stock fuel system.

The turbocharger system of the present invention may also include various other components, that while not necessarily required for operation, do add various feedback to the operator to ensure that the system is operating properly. For example, the oiling system alarm illustrated in FIG. 1, which may include various audible and visual alarms. The alarm can warn the driver of an oil pump or system failure. If the oil pump were to fail, oil would not exit the turbocharger. High temperatures and turbine rpms would then cause the oil to bake and carbonize, eventually causing turbine bearing and/or shaft failure.

Likewise, a vacuum/boost gauge may be provided by coupling to the engine intake manifold with a pressure line. The gauge would tell the driver if the engine is under vacuum or boost and the pressures, plus or minus.

A pyrometer gauge with exhaust probe and mounting hardware may also be provided. This gauge would relay the temperature of the exhaust exiting the engine to the driver. Under certain extended boost periods (e.g., pulling trailers or long steep grades), exhaust could reach temperatures high enough to damage components. Thus, by knowing the temperature, the driver could adjust driving conditions to regulate the exhaust temperature and prevent potential damage.

An air/fuel gauge with oxygen sensor and various wiring and hardware for mounting could also be provided. The gage would allow the driver to see how "rich" or "lean" the engine's fuel system is operating. Fuel mixture is important to turbocharger operation. If the fuel mixture is lean, high fuel mileage can result, but can be detrimental during boost conditions. Thus, the mixture gauge can warn the driver if possible fuel system problems are in progress before they cause engine damage. While such effects are gradual and occur over time, such damage may not be noticeable to the driver until major damage is caused. Thus, the mixture gauge can help the driver to prevent such incremental damage from occurring.

A transmission temperature gauge may also be a good addition to make sure that the transmission temperature does not exceed maximum operating temperatures that may otherwise damage transmission components. Because turbo systems allow drivers to have more power and pull larger loads at higher speeds and in higher gears or with taller tires, such conditions put additional stresses on transmission components, which could result in a transmission failure.

Other components may also be added such as a performance muffler for adding additional noise reduction to the vehicle's exhaust. Likewise, a performance mandrel bent tail pipe with mounting hardware may also be provided. In addition, a heat shield and various installation hardware may be provided around the turbocharger to protect surrounding components from heat from the turbocharger. Such shields may be formed from custom bent and formed sheet metal and are installed with various mounting hardware.

Those of skill in the art will appreciate, after an understanding of the present invention, that various modifications to the present invention may be made without departing from the spirit and scope thereof. For example, there may be various location points at which it may be advantageous to install the turbocharger system depending upon the type and/or configuration of the vehicle to which the turbocharger system is being installed. Moreover, there may be other accessories not specifically mentioned that are known in the art that may be added to the turbocharger system. In addition, it is to be understood that the above-described embodiments are only illustrative of the application of the principles of the present invention. Numerous modifications and alternatives may be devised by those skilled in the art, including combinations of the various embodiments, without departing from the spirit and scope of the present invention. The appended claims are intended to cover such modifications, alternative arrangements, and combinations.

What is claimed is:

1. A method of mounting a turbocharger to an internal combustion engine driven automobile, comprising:
    removing a portion of an existing exhaust system of an automobile while leaving any existing emission equipment of the automobile;
    installing a new exhaust system to the automobile;
    mounting an exhaust inlet of a turbocharger to the new exhaust system of the vehicle at a position downstream of the existing emission equipment;
    coupling an oil inlet of the turbocharger to an oil system;
    coupling an air outlet of the turbocharger to an exhaust pipe; and
    coupling an air charge outlet of the turbocharger to an air intake manifold of the automobile.

2. The method of claim 1, further including coupling an oil pump between an oil outlet of the turbocharger and a reservoir side of the oil system.

3. The method of claim 1, wherein removing a portion of an exhaust system includes removing an existing muffler from the automobile.

4. The method of claim 1, wherein leaving any existing emission equipment includes leaving the catalytic converter.

5. The method of claim 1, further including installing the turbocharger into stock mounts and exhaust flanges.

6. The method of claim 1, further including removing the oil pressure sending unit of the vehicle and installing a T fitting and an oil pressure line.

7. The method of claim 1, further including installing a check valve on an oil pressure line to the turbocharger.

8. The method of claim 2, further including installing an oil return line from the turbocharger to the oil pump so that oil can be evacuated from the turbocharger by the oil pump.

9. The method of claim 8, further including extending the oil return line to an engine oil fill cap of the automobile.

10. The method of claim 1, further comprising removing an existing air box and ducting to a throttle body of the vehicle and installing ducting from the turbocharger to automobiles intake manifold throttle body.

11. The method of claim 10, further including plumbing a mass air flow sensor of the automobile in the ducting.

12. The method of claim 10, further including installing a vent filter in a positive crankcase ventilation hose.

13. The method of claim 10, further including plumbing the positive crankcase ventilation hose into a charge air tube after a mass air flow sensor with an inline two-way valve operated by a pressure switch.

14. The method of claim 13, further including installing a pressure hose at least one of a charge air duct; an intake manifold and an exhaust in front of the turbocharger to a fuel pressure regulator.

15. A method of mounting a turbocharger to an internal combustion engine driven automobile, comprising:
    removing an existing muffler of the automobile;
    mounting a turbocharger in a space previously occupied by the existing muffler;
    coupling an exhaust inlet of the turbocharger to an exhaust system of the automobile while leaving any existing emission equipment of the automobile;
    coupling an exhaust outlet of the turbocharger to an exhaust pipe; and
    coupling an air charge outlet of the turbocharger to an air intake of the automobile.

16. The method of claim 15, further including coupling an oil inlet of the turbocharger to an oil system.

17. The method of claim 16, further including coupling the oil inlet of the turbocharger to a pressure side of the automobile oiling system.

18. The method of claim 17, further including coupling an oil outlet of the turbocharger to the oil reservoir of the oiling system at a position above the oil level.

19. The method of claim 16, further comprising coupling an oil pump between an oil outlet of the turbocharger and a reservoir of an oiling system of the vehicle.

20. The method of claim 19, further comprising coupling a check valve to an oil inlet of the turbocharger.

21. A method of mounting a turbocharger to an internal combustion engine driven automobile, comprising:
    replacing at least a portion of an existing exhaust system that is downstream of any existing emission equipment of an automobile with a new exhaust system while retaining the existing emission equipment of the automobile;
    coupling an exhaust inlet of a turbocharger to the new exhaust system of the vehicle downstream of the existing emission equipment;
    coupling an oil inlet of the turbocharger to an oil system;

coupling an air outlet of the turbocharger to an exhaust line; and coupling an air charge outlet of the turbocharger to an air intake manifold of the automobile.

22. The method of claim 21, further including coupling an oil pump between an oil outlet of the turbocharger and a reservoir side of the oil system.

23. The method of claim 21, wherein replacing at least a portion of an exhaust system includes replacing an existing muffler of the automobile with the turbocharger.

24. The method of claim 21, wherein retaining the existing emission equipment includes retaining the existing catalytic converter.

25. The method of claim 21, further including removing the oil pressure sending unit of the vehicle and installing a T fitting and an oil pressure line.

26. The method of claim 21, further including installing a check valve on an oil pressure line to the turbocharger.

27. The method of claim 22, further including installing an oil return line from the turbocharger to the oil pump so that oil can be evacuated from the turbocharger by the oil pump.

28. The method of claim 21, further including removing an existing air box and ducting to a throttle body of the vehicle and installing ducting from the turbocharger to automobiles intake manifold throttle body.

* * * * *